United States Patent [19]

Okudaira

[11] Patent Number: 4,730,906
[45] Date of Patent: Mar. 15, 1988

[54] BRIGHT WIDE-ANGLE ZOOM LENS
[75] Inventor: Sadao Okudaira, Tokyo, Japan
[73] Assignee: Asahi Kogaku Kogyo Kabushiki Kaisha, Tokyo, Japan
[21] Appl. No.: 868,461
[22] Filed: May 30, 1986
[30] Foreign Application Priority Data May 31, 1985 [JP] Japan ................. 60-118614

[51] Int. Cl.[4] ............... G02B 15/14; G02B 13/18; G02B 13/04; G02B 9/64
[52] U.S. Cl. .................. 350/426; 350/413; 350/458
[58] Field of Search ............. 350/426, 413, 458

[56] References Cited
U.S. PATENT DOCUMENTS 3,729,253  4/1973  Moore et al. ............ 350/413
4,367,927  1/1983  Fujii ..................... 350/426
4,571,032  2/1986  Somega et al. .......... 350/413

Primary Examiner—John K. Corbin
Assistant Examiner—Rebecca D. Gass
Attorney, Agent, or Firm—Sughrue, Mion, Zinn, Macpeak and Seas

[57] ABSTRACT

A compact and high-performance bright wide-angle zoom lens comprising, in order from the object side, a front group having a negative refractive power and a rear group having a positive refractive power, with a stop diaphragm being disposed between the front and rear groups. The front group, stop diaphragm and rear groups are capable of independent mechanical movement in response to a change in the focal length of the overall system. The rear group having a positive refractive power is composed, in order from the object side, of a positive lens unit, a negative lens unit, and a positive lens unit, with a lens element having a refractive index gradient profile along the optical axis being disposed in the positive lens unit on the image side of the rear group.

8 Claims, 8 Drawing Figures

BRIGHT WIDE-ANGLE ZOOM LENS

BACKGROUND OF THE INVENTION

The present invention relates to a bright wide-angle zoom lens which may be typically incorporated in an SRL camera.

Recent advances in the technology of zoom lenses have been remarkable. Particularly great advances have been made in zoom lenses of the retrofocus type which are composed, in order from the object side, of a negative lens group and a positive lens group, and this has made a contribution to the increasing use of wide-angle zoom lenses that are adapted for use with SRL cameras. One disadvantage of the wide-angle zoom lens is that it is not as bright as the fixed focus lens. Efforts have been made to design a bright zoom lens that is solely composed of the design elements used in the conventional lens system consisting of spherical lens elements but these efforts have met with limited success in commercial terms for various reasons such as insufficiency of optical performance and an undesirably large optical system. An alternative approach toward a bright zoom lens that features a higher performance and which is more compact in size depends on employing several aspherical surfaces within the optical system, but even with the state-of-the-art lens technology available today, lenses with aspherical surfaces are difficult to produce and involve high processing costs.

OBJECTS AND SUMMARY OF THE INVENTION

The primary object of the present invention is to provide a compact and very bright zoom lens of high performance by making use of the increased degree of freedom afforded by the new concept of a lens element having a refractive index gradient profile along the optical axis, this concept having seen remarkable advances in the art and having been utilized in many fields on an increasingly commercialized scale.

In order to attain the aforementioned object, the present invention provides a compact and high-performance bright wide-angle zoom lens comprising, in order from the object side, a front group having a negative refractive power and a rear group having a positive refractive power, with a stop diaphragm being disposed between the front and rear groups, said front group, said stop diaphragm and said rear group being capable of independent mechanical movement in response to a change in the focal length of the overall system. In accordance with the present invention, said rear group having a positive refractive power is composed, in order from the object side, of a positive lens unit, a negative lens unit, and a positive lens unit, with a lens element having a refractive index gradient profile along the optical axis being disposed in the positive lens unit on the image side of the rear group.

In a preferred embodiment of the zoom lens having the features described above, the lens element having a refractive index gradient profile along the optical axis satisfies the following relationship:

$$0.02 < \Delta N < 0.06$$

where $\Delta N$ is the absolute value of the change in the refractive index of said lens element.

To state the lens arrangement of this zoom lens more specifically, the front group having a negative refractive power is composed, in order from the object side, of a positive lens, negative lens, negative lens, positive lens, negative lens, and a positive lens; and the rear group having a positive refractive power is composed of a positive lens unit, a negative lens unit, and a positive lens unit, said first positive lens unit being composed, in order from the object side, of a positive cemented lens comprised of positive and negative lenses, a positive lens, and a positive lens having a surface with a smaller radius of curvature directed toward the object side, said negative lens unit being composed of a negative lens having a surface with a smaller radius of curvature directed toward the image side, said second positive lens unit being composed, in order from the object side, of a positive cemented lens comprised of negative and positive lenses and a positive lens, and the positive lens which is closest to the image side being a lens element having a refractive index gradient profile along the optical axis.

BRIEF DESCRIPTION OF THE INVENTION

DESCRIPTION OF THE PREFERRED EMBODIMENTS

Figure 1:
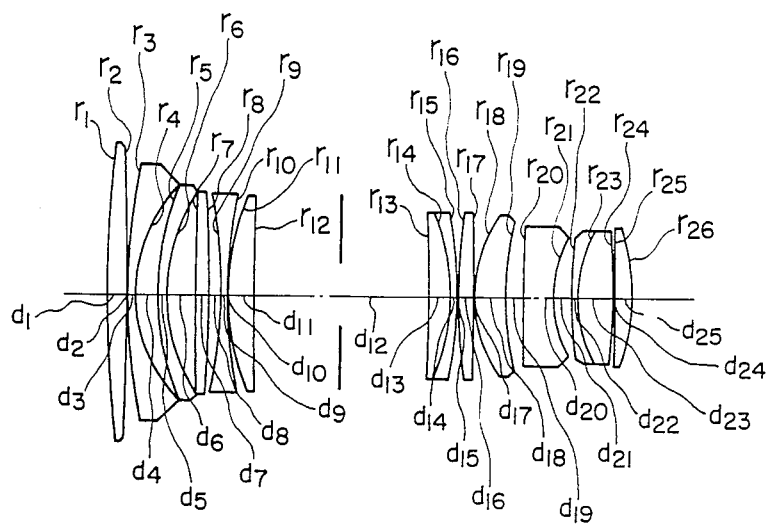
FIG. 1 is a cross-sectional view of the zoom lens system constructed in Example 1 for the wide-angle position.
Figure 2:
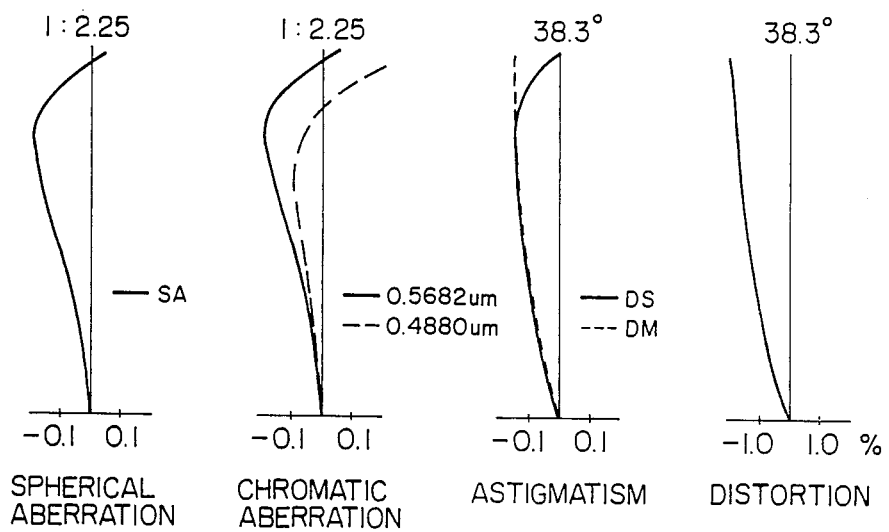
FIGS. 2, 3 and 4 are graphs plotting the aberration curves obtained in Example 1 at the wide-angle, middle-angle and narrow-angle positions, respectively.
Figure 3:
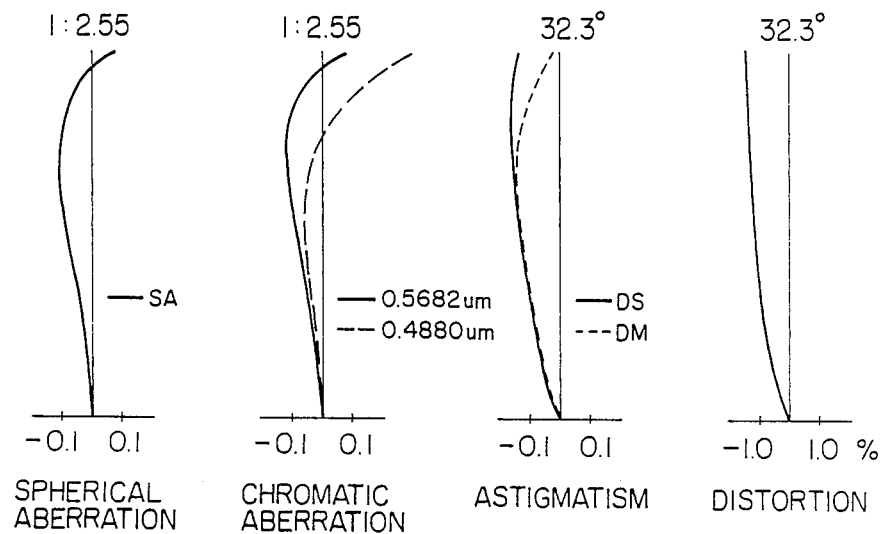
Figure 4:
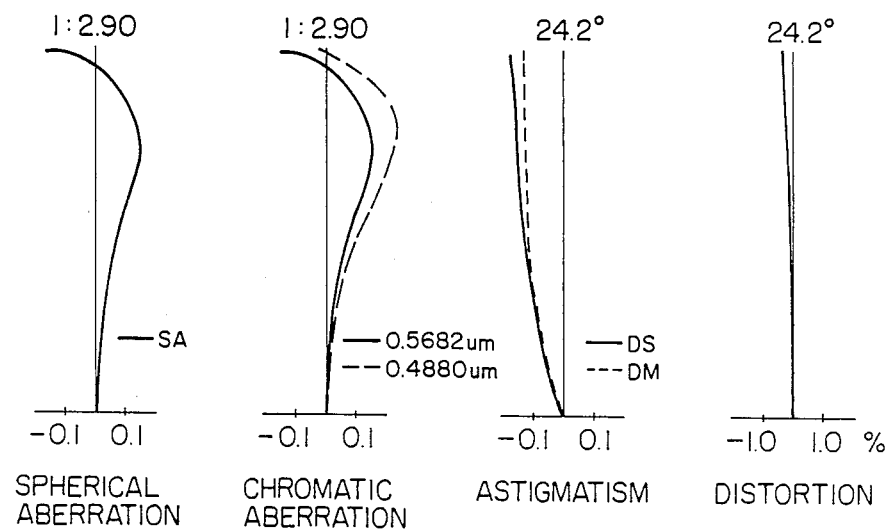
Figure 5:
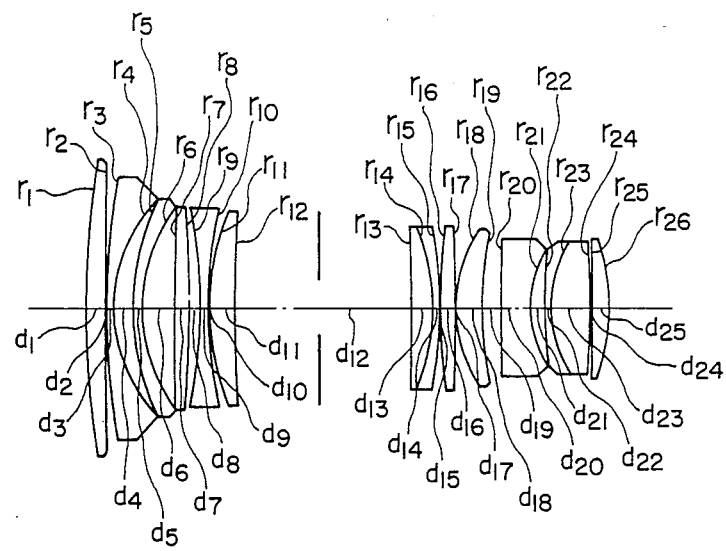
FIG. 5 is a cross-sectional view of the zoom lens system constructed in Example 2 for the wide-angle position.
Figure 6:
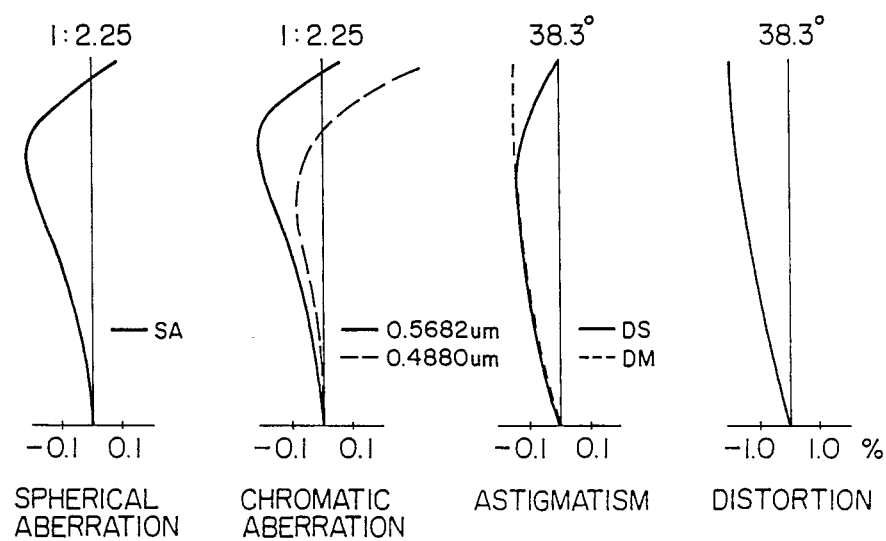
FIGS. 6, 7 and 8 are graphs plotting the aberration curves obtained in Example 2 at the wide-angle, middle-angle and narrow-angle positions, respectively.
Figure 7:
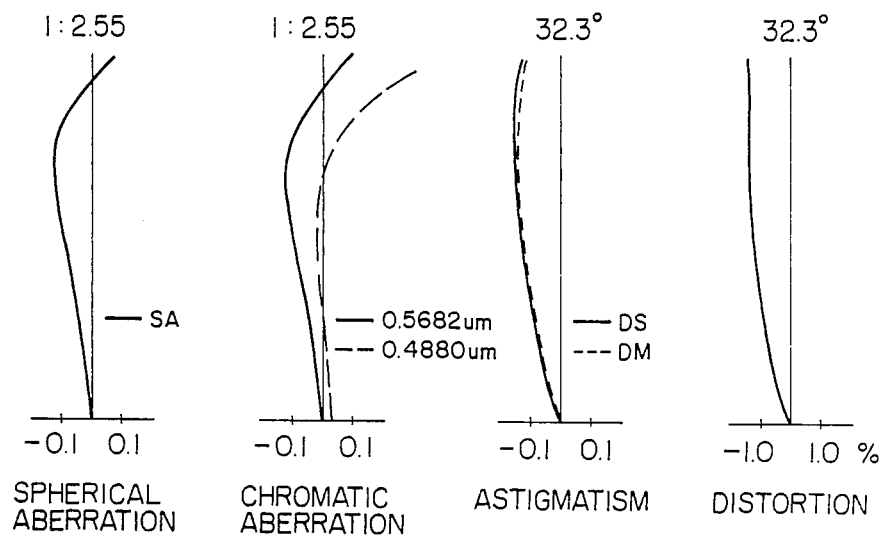
Figure 8:
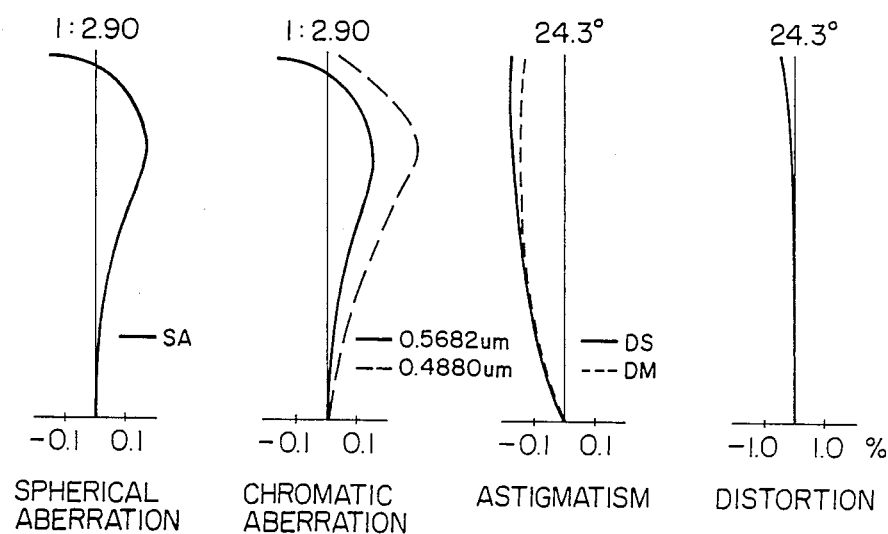

The present invention provides a wide-angle zoom lens and its overall system is of the retrofocus type composed, in order from the object side, of a negative front group and a positive rear group. The first lens group for focusing in the wide-angle zoom lens may be a positive lens group, but more desirably, focusing is accomplished by a negative lens group because this reduces the aberrational variations resulting from changes in the object distance and is effective for the purpose of producing a bright lens system. In this connection, it should be mentioned that in order to use a positive group as the first lens group of a long backfocus zoom lens system adapted for use with an SLR camera, a complex arrangement involving three or more movable lens groups is necessary.

If, in the conventional zoom lens of the two-group type, the stop diaphragm is designed to be movable as a unit together with the rear group, the occurrence of coma flare at narrow angle position is unavoidable, and a bright zoom lens of the type contemplated by the present invention will experience the fatal problem of reduced contrast in the low-frequency range. In accordance with the present invention, this problem is eliminated by disposing the stop diaphragm between the front and rear groups and by allowing the front group, the stop diaphragm and the rear group to be moved mechanically and independently of each other in response to a change in the focal length of the overall system.

In accordance with the present invention, a lens element in the positive lens group close to the image side and provided with a refractive index gradient profile which is a function solely depending upon co-ordinates (i.e., so-called axial gradient index) is effective in correcting the spherical and coma aberrations that may occur in a bright or high-speed lens which inherently involves considerable difficulty in correcting these aberrations. An additional advantage of economy results from the fact that the lens in the rear group which is close to the image side has a small diameter among the lens elements used in the system because it is costly to produce a large-diameter lens having a refractive index index gradient profile.

In addition, the front group composed of positive, negative, negative, positive, negative and positive lenses in order from the object side will provide greater effectiveness in correcting distortions and spherical aberrations by means of combining this front group with the rear group.

If the value of $\Delta N$ is smaller than 0.02, the intended correction of aberrations is not realized. If, on the other hand, $\Delta N$ is greater than 0.06, difficulty is encountered with fabricating a lens having the desired refractive index profile. Therefore, $\Delta N$ is preferably within the range of from 0.02 to 0.06.

EXAMPLES

Two specific examples of the present invention are hereunder described, wherein f is the focal length, $F_{NO}$ is the f-number, $\omega$ is the half view angle, r is the radius of curvature of a specific lens surface, d is the thickness of a specific lens or the aerial distance between adjacent lenses, and Na, Nb and Nc represent the refractive indices of a specific lens at wavelengths of 0.5682 $\mu$m, 0.6471 $\mu$m and 0.488 $\mu$m, respectively.

EXAMPLE 1

| f = 28.8~35.0~48.0 $F_{NO}$ = 1:2.25~2.55~2.90 $\omega$ = 38.3°~32.3°~24.2° | | | | | |
|---|---|---|---|---|---|
| Surface No. | r | d | Na | Nb | Nc |
| 1 | 151.755 | 3.11 | 1.73654 | 1.73106 | 1.74504 |
| 2 | 921.764 | 0.20 | | | |
| 3 | 106.300 | 1.20 | 1.83633 | 1.82814 | 1.84942 |
| 4 | 25.970 | 3.31 | | | |
| 5 | 38.754 | 1.50 | 1.83633 | 1.82814 | 1.84942 |
| 6 | 27.450 | 5.54 | | | |
| 7 | 317.405 | 2.58 | 1.72539 | 1.71847 | 1.73655 |
| 8 | −200.000 | 1.80 | | | |
| 9 | −87.610 | 1.20 | 1.63975 | 1.63646 | 1.64638 |
| 10 | 71.800 | 0.20 | | | |
| 11 | 39.010 | 4.24 | 1.80843 | 1.79712 | 1.82717 |
| 12 | 232.266 | Variable | | | |
| 13 | −254.587 | 3.57 | 1.83685 | 1.82965 | 1.84818 |
| 14 | −33.124 | 1.15 | 1.85029 | 1.83768 | 1.87133 |
| 15 | −70.680 | 0.20 | | | |
| 16 | 110.000 | 2.46 | 1.80580 | 1.79941 | 1.81578 |
| 17 | −525.000 | 0.20 | | | |
| 18 | 22.910 | 4.60 | 1.83633 | 1.82814 | 1.84942 |
| 19 | 61.411 | 3.34 | | | |
| 20 | 719.556 | 5.00 | 1.85029 | 1.83768 | 1.87133 |
| 21 | 21.273 | 2.42 | | | |
| 22 | 83.484 | 1.00 | 1.83685 | 1.82965 | 1.84818 |
| 23 | 21.776 | 6.49 | 1.56968 | 1.56629 | 1.57482 |
| 24 | −105.520 | 0.20 | | | |
| 25 | ∞ | 3.00 | varies as shown below | | |
| 26 | −34.055 | | | | |

| | f | | |
|---|---|---|---|
| | 28.8 | 35.0 | 48.0 |
| $d_{12}$ | 18.36 stop diaphragm | 12.41 stop diaphragm | 2.93 stop diaphragm |
| | 11.64 | 6.22 | 1.39 |

$\Delta N = 0.0309$

EXAMPLE 2

| f = 28.8~35.0~48.0 $F_{NO}$ = 1:2.25~2.55~2.90 $\omega$ = 38.3°~32.3°~24.3° | | | | | |
|---|---|---|---|---|---|
| Surface No. | r | d | Na | Nb | Nc |
| 1 | 227.465 | 3.06 | 1.51718 | 1.51414 | 1.52177 |
| 2 | −919.110 | 0.20 | | | |
| 3 | 98.688 | 1.20 | 1.83633 | 1.82814 | 1.84942 |
| 4 | 25.119 | 3.93 | | | |
| 5 | 43.799 | 1.50 | 1.73088 | 1.72170 | 1.74598 |
| 6 | 30.483 | 5.09 | | | |
| 7 | 1081.085 | 2.18 | 1.74351 | 1.73396 | 1.75925 |
| 8 | −230.069 | 1.98 | | | |
| 9 | −82.020 | 1.20 | 1.62149 | 1.61764 | 1.62740 |
| 10 | 80.646 | 0.20 | | | |
| 11 | 42.367 | 4.28 | 1.80843 | 1.79712 | 1.82717 |
| 12 | 927.908 | Variable | | | |
| 13 | −368.365 | 3.74 | 1.78775 | 1.78120 | 1.79807 |
| 14 | −33.324 | 1.15 | 1.85029 | 1.83768 | 1.87133 |
| 15 | −67.654 | 0.20 | | | |
| 16 | 93.816 | 2.50 | 1.80580 | 1.79941 | 1.81578 |
| 17 | −1903.529 | 0.20 | | | |
| 18 | 23.039 | 5.24 | 1.83633 | 1.82814 | 1.84942 |
| 19 | 55.039 | 2.99 | | | |
| 20 | 319.618 | 5.00 | 1.85029 | 1.83768 | 1.87133 |
| 21 | 20.934 | 3.05 | | | |
| 22 | 76.266 | 1.00 | 1.83685 | 1.82965 | 1.84818 |
| 23 | 21.619 | 6.04 | 1.56968 | 1.56629 | 1.57482 |
| 24 | −111.609 | 0.20 | | | |
| 25 | ∞ | 3.00 | varies as shown below | | |
| 26 | −35.265 | | | | |

| | f | | |
|---|---|---|---|
| | 28.8 | 35.0 | 48.0 |
| $d_{12}$ | 18.20 stop diaphragm | 13.22 stop diaphragm | 2.28 stop diaphragm |
| | 11.15 | 4.72 | 1.31 |

$\Delta N = 0.0309$

In each of the examples shown above, the lens closest to the image side has a refractive index profile, and a specific value of its refractive index N is given by:

$$N = a_0 + \sum_{i=1}^{4} a_i(x - 3.2)^i$$

where x represents the distance of a certain point from the reference surface which is the plane on the object side of the final lens element having a refractive index profile, with the positive value of x being taken in the direction approaching the image side.

The respective values of $a_0$, $a_1$, $a_2$, $a_3$ and $a_4$ are as follows:

$\lambda = 0.5682$ $\mu$m:
 $a_0 = 1.5033 + 0.0364 = 1.5397$
 $a_1 = 0.590943 \times 10^{-2}$
 $a_2 = -0.573897 \times 10^{-2}$
 $a_3 = -0.190085 \times 10^{-2}$
 $a_4 = -0.160811 \times 10^{-3}$ $\lambda = 0.6471$ $\mu$m:
 $a_0 = 1.5001 + 0.0355 = 1.5356$
 $a_1 = 0.549239 \times 10^{-2}$
 $a_2 = -0.571981 \times 10^{-2}$
 $a_3 = -0.187696 \times 10^{-2}$
 $a_4 = -0.159504 \times 10^{-3}$ $\lambda = 0.488$ $\mu$m:

$a_0 = 1.5084 + 0.0375 = 1.5459$
$a_1 = 0.601061 \times 10^{-2}$
$a_2 = -0.597036 \times 10^{-2}$
$a_3 = -0.197622 \times 10^{-2}$
$a_4 = -0.167942 \times 10^{-3}$

What is claimed is:

1. In a compact and high-performance bright wide-angle zoom lens comprising, in order from the object side, a front group having a negative refractive power and a rear group having a positive refractive power, with a stop diaphragm being disposed between the front and rear groups, said front group, said stop diaphragm and said rear group being capable of independent mechanical movement in response to a change in the focal length of the overall system, the improvement wherein the rear group having a positive refractive power is composed, in order from the object side, of a positive lens unit, a negative lens unit, and a positive lens unit, with a lens element having a refractive index gradient profile along the optical axis being disposed in the positive lens unit on the image side of the rear group.

2. The zoom lens according to claim 1 wherein said lens element having a refractive index gradient profile along the optical axis satisfies the following relationship:

$$0.02 < \Delta N > 0.06$$

where $\Delta N$ is the absolute value of the change in the refractive index of said lens element.

3. The zoom lens according to claim 1 wherein said front group having a negative refractive power is composed, in order from the object side, of a positive lens, negative lens, negative lens, positive lens, negative lens, and a positive lens.

4. The zoom lens according to claim 1, wherein said rear group having a positive refractive power is composed of a positive lens unit, a negative lens unit, and a positive lens unit, said first positive lens unit being composed, in order from the object side, of a positive cemented lens comprised of positive and negative lenses, a positive lens, and a positive lens having a surface with a smaller radius of curvature directed toward the object side, said negative lens unit being composed of a negative lens having a surface with a smaller radius of curvature directed toward the image side, said second positive lens unit being composed, in order from the object side, of a positive cemented lens comprised of negative and positive lenses and a positive lens, and the positive lens which is the closest to the image side being a lens element having a refractive index gradient profile along the optical axis.

5. The zoom lens according to claim 1, further satisfying the following chart:

| Surface No. | r | d | Na | Nb | Nc |
| --- | --- | --- | --- | --- | --- |
| 1 | 151.755 | 3.11 | 1.73654 | 1.73106 | 1.74504 |
| 2 | 921.764 | 0.20 | | | |
| 3 | 106.300 | 1.20 | 1.83633 | 1.82814 | 1.84942 |
| 4 | 25.970 | 3.31 | | | |
| 5 | 38.754 | 1.50 | 1.83633 | 1.82814 | 1.84942 |
| 6 | 27.450 | 5.54 | | | |
| 7 | 317.405 | 2.58 | 1.72539 | 1.71847 | 1.73655 |
| 8 | −200.000 | 1.80 | | | |
| 9 | −87.610 | 1.20 | 1.63975 | 1.63646 | 1.64638 |
| 10 | 71.800 | 0.20 | | | |
| 11 | 39.010 | 4.24 | 1.80843 | 1.79712 | 1.82717 |
| 12 | 232.266 | Variable | | | |
| 13 | −254.587 | 3.57 | 1.83685 | 1.82965 | 1.84818 |
| 14 | −33.124 | 1.15 | 1.85029 | 1.83768 | 1.87133 |
| 15 | −70.680 | 0.20 | | | |
| 16 | 110.000 | 2.46 | 1.80580 | 1.79941 | 1.81578 |
| 17 | −525.000 | 0.20 | | | |
| 18 | 22.910 | 4.60 | 1.83633 | 1.82814 | 1.84942 |
| 19 | 61.411 | 3.34 | | | |
| 20 | 719.556 | 5.00 | 1.85029 | 1.83768 | 1.87133 |
| 21 | 21.273 | 2.42 | | | |
| 22 | 83.484 | 1.00 | 1.83685 | 1.82965 | 1.84818 |
| 23 | 21.776 | 6.49 | 1.56968 | 1.56629 | 1.57482 |
| 24 | −105.520 | 0.20 | | | |
| 25 | ∞ | 3.00 | varies as shown below | | |
| 26 | −34.055 | | | | |

| | f | | |
| --- | --- | --- | --- |
| | 28.8 | 35.0 | 48.0 |
| $d_{12}$ | 18.36 | 12.41 | 2.93 |
| | stop diaphragm | stop diaphragm | stop diaphragm |
| | 11.64 | 6.22 | 1.39 |

$\Delta N = 0.0309$ where r is the radius of curvature of a specific lens surface;

d is the thickness of a specific lens or the aerial distance between adjacent lenses; and Na, Nb and Nc represent the refractive indices of a specific lens at wavelengths of 0.5682 μm, 0.6471 μm, and 0.488 μm, respectively.

6. The zoom according to claim 1, further satisfying the following chart:

| $f = 28.8 \sim 35.0 \sim 48.0$ $F_{NO} = 1:2.25 \sim 2.55 \sim 2.90$ $\omega = 38.3° \sim 32.3° \sim 24.3°$ | | | | | |
| --- | --- | --- | --- | --- | --- |
| Surface No. | r | d | Na | Nb | Nc |
| 1 | 227.465 | 3.06 | 1.51718 | 1.51414 | 1.52177 |
| 2 | −919.110 | 0.20 | | | |
| 3 | 98.688 | 1.20 | 1.83633 | 1.82814 | 1.84942 |
| 4 | 25.119 | 3.93 | | | |
| 5 | 43.799 | 1.50 | 1.73088 | 1.72170 | 1.74598 |
| 6 | 30.483 | 5.09 | | | |
| 7 | 1081.085 | 2.18 | 1.74351 | 1.73396 | 1.75925 |
| 8 | −230.069 | 1.98 | | | |
| 9 | −82.020 | 1.20 | 1.62149 | 1.61764 | 1.62740 |
| 10 | 80.646 | 0.20 | | | |
| 11 | 42.367 | 4.28 | 1.80843 | 1.79712 | 1.82717 |
| 12 | 927.908 | Variable | | | |
| 13 | −368.365 | 3.74 | 1.78775 | 1.78120 | 1.79807 |
| 14 | −33.324 | 1.15 | 1.85029 | 1.83768 | 1.87133 |
| 15 | −67.654 | 0.20 | | | |
| 16 | 93.816 | 2.50 | 1.80580 | 1.79941 | 1.81578 |
| 17 | −1903.529 | 0.20 | | | |
| 18 | 23.039 | 5.24 | 1.83633 | 1.82814 | 1.84942 |
| 19 | 55.039 | 2.99 | | | |
| 20 | 319.618 | 5.00 | 1.85029 | 1.83768 | 1.87133 |
| 21 | 20.934 | 3.05 | | | |
| 22 | 76.266 | 1.00 | 1.83685 | 1.82965 | 1.84818 |
| 23 | 21.619 | 6.04 | 1.56968 | 1.56629 | 1.57482 |
| 24 | −111.609 | 0.20 | | | |
| 25 | ∞ | 3.00 | varies as shown below | | |
| 26 | −35.265 | | | | |

| | f | | |
| --- | --- | --- | --- |
| | 28.8 | 35.0 | 48.0 |
| $d_{12}$ | 18.20 | 13.22 | 2.28 |
| | stop diaphragm | stop diaphragm | stop diaphragm |
| | 11.15 | 4.72 | 1.31 |

$\Delta N = 0.0309$ where r is the radius of curvature of a specific lens surface;

d is the thickness of a specific lens or the aerial distance between adjacent lenses; and Na, Nb, and Nc represent the refractive indices of a specific lens at wavelengths of 0.5682 μm, 0.6471 μm, and 0.488 μm, respectively.

7. In a compact and high-performance bright wide-angle zoom lens comprising, in order from the object side, a front group having a negative refractive power and a rear group having a positive refractive power, with a stop diaphragm being disposed between the front and rear groups, said front group, said stop diaphragm and said rear group being capable of independent mechanical movement in response to a change in the focal length of the overall system, the improvement wherein the rear group having a positive refractive power is composed, in order from the object side, of a positive lens unit, a negative lens unit, and a positive lens unit, with a lens element having a refractive index gradient profile along the optical axis being disposed in the positive lens unit on the image side of the rear group, and wherein said front group having a negative refractive power is composed, in order from the object side, of a positive lens, negative lens, negative lens, positive lens, negative lens, and a positive lens.

8. In a compact and high-performance bright wide-angle zoom lens comprising, in order from the object side, a front group having a negative refractive power and a rear group having a positive refractive power, with a stop diaphragm being disposed between the front and rear groups, said front group, said stop diaphragm and said rear group being capable of independent mechanical movement in response to a change in the focal length of the overall system, the improvement wherein the rear group having a positive refractive power is composed, in order from the object side, of a first positive lens unit, a negative lens unit, and a second positive lens unit, said first positive lens unit being composed, in order from the object side, of a positive cemented lens comprised of positive and negative lenses, a positive lens, and a positive lens having a surface with a smaller radius of curvature directed toward the object side, said negative lens unit being composed of a negative lens having a surface with a smaller radius of curvature directed toward the image side, said second positive lens unit being composed, in order from the object side, of a positive cemented lens comprised of negative and positive lenses and a positive lens, the last-mentioned positive lens which is the closest to the image side being a lens element having a refractive index gradient profile along the optical axis.

* * * * *